United States Patent [19]

Lucas et al.

[11] Patent Number: 4,902,344

[45] Date of Patent: Feb. 20, 1990

[54] FERRIC CHLORIDE LEACH OF A METAL-SULPHIDE BEARING MATERIAL

[75] Inventors: Bernard H. Lucas, Nepean; David Y. Shimano, Hull, both of Canada

[73] Assignee: Canadian Patents & Development Ltd., Ottawa, Canada

[21] Appl. No.: 264,147

[22] Filed: Oct. 27, 1988

[30] Foreign Application Priority Data

Nov. 20, 1987 [CA] Canada ................................. 552378

[51] Int. Cl.$^4$ ................................................ C22B 3/00
[52] U.S. Cl. ..................................... 75/101 R; 75/114; 75/117; 75/118 R; 75/120; 423/38; 423/46; 423/98; 423/109
[58] Field of Search ..................... 75/101 R, 114, 120, 75/118 R, 117; 423/27, 109, 150, 38, 46, 98

[56] References Cited

U.S. PATENT DOCUMENTS 3,884,831 5/1975 Bloom ................................. 75/117
4,241,031 12/1980 Meyer et al. ....................... 423/150

*Primary Examiner*—Robert L. Stoll
*Attorney, Agent, or Firm*—Alan A. Thomson

[57] ABSTRACT

The present invention relates to an aqueous ferric chloride leach process for the extraction of metal values from a metal-sulphide bearing material, the leach being carried out in the presence of a leaching aid chosen from among salts of diesters of sulphodicarboxylic acids. It, in particular, relates to the enhanced recovery of metal values from complex, metal-sulphide bearing materials such as, for example, fine grained, polymetallic sulphide ores, their concentrates or the like.

20 Claims, No Drawings

FERRIC CHLORIDE LEACH OF A METAL-SULPHIDE BEARING MATERIAL

The present invention relates to an aqueous ferric chloride leach process for the extraction of metal values from a metal-sulphide bearing material, the leach being carried out in the presence of a leaching aid chosen from among salts of diesters of sulphodicarboxylic acids. It, in particular, relates to the enhanced recovery of metal values from complex, metal-sulphide bearing materials such as, for example, fine grained, polymetallic sulphide ores, their concentrates or the like.

For the purpose of the present invention, it is to be understood that the term "complex" characterizes a material as having a complex mineralogy, i.e. as a material comprising a plurality of mineralizations which are finely dispersed and which are present not only as free grains but also as mutual intergrowths and inclusions. Thus, for example, a reference to a complex, metal-sulphide bearing material (e.g. a complex, metal-sulphide bearing zinc ore) is to be understood as being a reference to a material having a complex mineralogy as referred to above.

It has been previously proposed to use agents to assist in the acid leaching of uranium oxide ores and in the cyanide leaching of gold bearing materials. Known materials or agents include those such as Aerosol* OT (available from Cyanamid Canada Inc.), which is based on a diester of the mono sodium salt of sulphosuccinic acid, i.e. on di(2-ethyl-hexyl) sodium sulphosuccinate. Such esters are generally described in U.S. Pat. No. 2,028,091, U.S. Pat. No. 2,176,423 and U.S. Pat. No. 2,794,004. An acid or cyanide leach, however, offers a different process environment than that present for a ferric chloride leach of sulphide materials with which the present invention is concerned. These agents have not been suggested for use in the context of a ferric chloride leach of a complex metal-sulphide bearing material, the leach producing elemental sulphur.

* trade mark

Complex ore bodies of finely disseminated sulphide minerals are found in various countries around the world. For example, highly pyritic, complex zinc ores are found in Canada (e.g. in New Brunswick), Australia and Europe. These complex zinc ores can contain lead as well as secondary metal values such as copper and/or silver. Typically, numerous sulphide minerals are present in such ores as free grains and as mutual intergrowths and inclusions, the various mineralizations being very finely dispersed throughout a pyritic matrix. The minerals which may be present include those such as chalcopyrite, chalcocite, bornite, sphalerite, galena, anglesite, tetrahedrite, pyrrhotite, pyrite, calcite, dolomite and the like.

Due to their complicated mineralogy, complex sulphide ores are not easily exploited by presently known techniques. For example, they are not readily susceptible to differential froth flotation. As a result, individual, market grade concentrates, of each of the minerals containing metal values such as zinc, lead, copper, . . . etc., cannot be readily produced from such ores.

Although some of the above types of ores may be subjected to bulk flotation techniques to provide a bulk concentrate (i.e. a concentrate comprising a mixture of minerals), high recovery of all of the metal values from such concentrates is hampered by the mineralogical complexity of the materials.

It is known, for example, that copper and other non-ferrous metals such as lead, zinc and silver can be leached from a metal-sulphide bearing material by means of an aqueous ferric chloride leach solution, the aqueous leach solution containing an oxidizing component comprising ferric ions or a combination of ferric and cupric ions; U.S. Pat. No. 3,798,026, U.S. Pat. No. 3,923,616, U.S. Pat. No. 4,337,128, U.S. Pat. No. 4,544,460, and U.S. Pat. No. 4,552,632. Ferric chloride is the prime leaching agent for this type of leach; i.e. it is not a typical acid leach. The dissolution of metal values from minerals such as sphalerite, chalcopyrite, . . . etc. is dependent principally on the concentration of ferric ion; the dissolution rate of metal values, such as copper and silver, from minerals, such as those referred to above, generally increases with increasing ferric ion concentration. It has also been found, that chalcopyrite (i.e. Cu values) and tetrahedrite (i.e. Ag values) dissolutions, are also particularly temperature dependent and increase with increasing temperature.

Known leaching techniques, using an aqueous ferric chloride leach solution for the extraction of metal values from complex, metal-sulphide bearing materials, may not, however, obtain as complete a leaching as desired of such secondary metal values as copper and silver.

This, in particular, has been found to be the case when dealing with a bulk concentrate of a complex, metal-sulphide bearing zinc ore such as may be found in New Brunswick. It has been found that leaching conditions which favour an efficient leach of the substantial portion of zinc and lead values (i.e. primary metal values) do not provide as high an extraction of copper and silver metal values (i.e. secondary metal values) as for these primary metal values. The order of reactivity with respect to ferric chloride leaching of metal values from minerals present in a New Brunswick "bulk concentrate" may be as follows:

galena(Pb) > sphalerite(Zn) > chalcopyrite(Cu) > tetrahedrite(Ag);

i.e. lead values from galena will be leached more quickly than the zinc values from sphalerite . . . etc. Since the secondary metal values are not present in substantial amounts, any extended retention time to recover these secondary metal values over and beyond the retention time needed to achieve the substantial extraction of the zinc and lead values, is not economically attractive even though their more complete recovery may be desired.

During a ferric chloride leach, elemental sulphur is produced. Typical leach or dissolution reactions with respect to a ferric chloride leach of a New Brunswick "bulk concentrate" as referred to above may be as follows:

$$PbS + 2FeCl_3 \rightarrow PbCl_2 + 2FeCl_2 + S°$$

$$ZnS + 2FeCl_3 \rightarrow ZnCl_2 + 2FeCl_2 + S°$$

$$CuFeS_2 + 4FeCl_3 \rightarrow CuCl_2 + 5FeCl_2 + 2S°$$

It is felt that the elemental sulphur tends to cement solid particles together into coarser grains or agglomerations and that this can interfere with the leaching process.

Foaming is also a common problem during a ferric chloride leach. Foaming can be minimized by slowing down the rate at which the lixiviant is admixed with the sulphide-bearing material but this will likewise decrease the reaction rate and thus undesirably increase the leach time. If foaming is too severe there may even be a loss of materials due to overflow from the reactor.

It would be advantageous to have an aqueous ferric chloride leach process which can provide an enhanced extraction of metal values contained in a complex, metal-sulphide bearing material such as, for example, a complex, metal-sulphide bearing ore, a bulk concentrate thereof or the like.

It would, in particular, be advantageous to have an aqueous ferric chloride leach process which can provide an enhanced extraction of secondary metal values contained in a complex, metal-sulphide bearing material such as, for example, a complex, metal-sulphide bearing ore, a bulk concentrate thereof or the like, i.e. a process wherein by the time that substantially all of the primary metal values have been extracted, an enhanced amount of secondary metal values will have also been extracted.

It would be advantageous to have a hydrometallurgical process as described above, for the extraction of primary and secondary metal values, from a bulk concentrate of a complex, metal-sulphide bearing ore, the primary metal values comprising one or more members of the group comprising zinc and lead, the secondary metal values comprising one or more members of the group comprising copper and silver.

It would also be advantageous to be able to suppress foaming during ferric chloride leaching of complex metal-sulphide bearing materials.

SUMMARY OF INVENTION

In accordance with the present invention enhanced extraction of metal values from a complex, metal-sulphide bearing material may be obtained by a hydrometallurgical process wherein the material is contacted with an aqueous ferric chloride leach solution in the presence of an effective amount of a leaching aid chosen from among salts of diesters of sulphodicarboxylic acids.

Thus, the present invention, in particular, provides a process for leaching a complex, metal-sulphide bearing material, wherein said material is contacted with an aqueous ferric chloride leach solution whereby metal values are brought into solution as chlorides thereof, characterized in that said material is contacted with said leach solution in the presence of an effective amount of a leaching aid comprising one or more compounds of general formula (I)

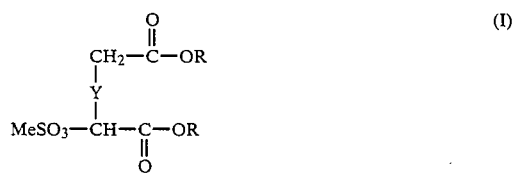

wherein
Me is an alkali metal,
Y is a single carbon to carbon bond or an alkylene chain of not more than 4 carbon atoms and
the R's, the same or different, each represents an alkyl group of 3 to 8 carbon atoms.

In accordance with the process of the present invention, the leach may be carried out in one or more stages. Each stage may use a leach solution of the same strength and composition or they may use leach solutions of different strength and/or composition.

The present invention further provides, a two stage leach process for leaching a complex, metal-sulphide bearing material, wherein fresh, complex, metal-sulphide bearing material is fed to a first leach stage, wherein the residue of said material from the first leach stage is fed to a second leach stage, wherein, for each of said leach stages, the material to be leached is contacted with a respective aqueous ferric chloride leach solution whereby metal values are brought into solution as chlorides thereof, said leach solutions each comprising a respective oxidizing component, wherein for the first leach stage said fresh complex material is present in stoichiometric excess relative to the oxidizing component of the first stage leach solution, wherein for the second leach stage the oxidizing component of the second stage leach solution is present in stoichiometric excess relative to said residue, characterized in that for each leach stage, the material to be leached is contacted with a respective leach solution in the presence of an effective amount of a leaching aid comprising one or more compounds of general formula (I)

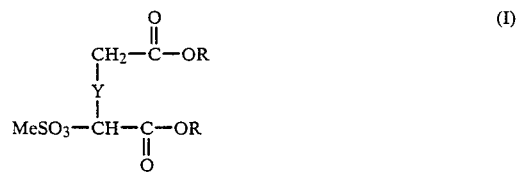

wherein
Me is an alkali metal,
Y is a single carbon to carbon bond or an alkylene chain of not more than 4 carbon atoms and
the R's, the same or different, each represents an alkyl group of 3 to 8 carbon atoms.

In accordance with the present invention, for a two stage leach as described above, recycled ferric chloride leach solution may, for example, be fed to the second leach stage. On the other hand, ferric chloride leach liquour, from the second leach stage, may be fed to the first leach stage. Before being fed to the first leach stage, the ferric chloride leach liquour from the second leach stage may, if desired, be subjected to a regeneration treatment to transform the iron (II) values therein back to the ferric state. In any event, the relative stoichiometric ratios between the oxidizing component and the materials to be leached at either leach stage should be observed; e.g. the first leach stage is to be conducted so that the fresh complex material is present in stoichiometric excess relative to the oxidizing component of the leach solution thereof.

In accordance with the present invention, the complex metal-sulphide bearing material may, for example, be a bulk concentrate of a complex, metal-sulphide bearing ore.

In accordance with the present invention, the complex, metal-sulphide bearing material may be a bulk concentrate of a complex, metal-sulphide bearing zinc ore containing metal sulphides of primary metal values and of secondary metal values, the primary metal values comprising lead and zinc and the secondary metal values comprising copper and silver. Such a concentrate may of course contain other metal values.

In the context of the present invention, the expressions "primary metal values" and "secondary metal values" are to be understood to refer to relative amounts of the various metal values which may be present in a material, the primary metal values being those which are present in a predominant amount relative to the amount of secondary metal values.

In accordance with the present invention, metal values in the starting raw material (e.g. bulk concentrate) are brought into solution as metal chlorides thereof. The metal values may be recovered from solution in known manner. The solution from which the metal values have been recovered may thereafter be subjected to a regeneration process whereby ferrous ions are reoxidized to ferric ions and the so regenerated leach solution may be recycled, for example, to the second stage of a two stage leach (see, for example, U.S. Pat. No. 4,337,128).

As indicated above, known ferric chloride leaching techniques, may not provide extractions which are as complete as may be desired.

The following extractions (% by wt) have been found to be obtainable with respect to an aqueous ferric chloride leach of a complex, pyritic Zn-Pb-Cu-Ag bulk concentrate, *in the absence* of a leaching aid as described above:

for a single stage batch leach, extractions of 99.5% Pb, 95% Zn, 85% Cu and 85% Ag:

for a two stage batch leach, extractions of 99.0% Pb, 97.5% Zn, 95.0% Cu and 91.5% Ag:

On the other hand, surprisingly, the following extractions (% by wt) of metal values have been found to be obtainable with respect to an aqueous ferric chloride leach of a complex, pyritic Zn-Pb-Cu-Ag bulk concentrate which is carried out *in the presence* of a leaching aid as described above (e.g. in the presence of di(2-ethyl-hexyl) sodium sulphosuccinate):

for a single stage batch leach, extractions of 99.6% Pb, 99.5% Zn, 98.7% Cu and 96.7% Ag:

for a two stage batch leach, extractions of 99.5% Pb, 99.5% Zn, 98.0% Cu and 96.5% Ag.

From the above, it can be seen that the presence of a leaching aid in accordance with the present invention can enhance the extraction of metal values (e.g. of secondary metal values such as copper and silver).

As previously indicated, it is felt that the elemental sulphur, produced during the ferric chloride leach, leads to agglomeration of solid particles. It is further believed that the presence of the leaching aid modifies the elemental sulphur coating on solid particles so as to reduce agglomeration and in this way enhance the leaching effect of the FeCl₃ lixiviant. For example, it has been observed that in the absence of a leaching aid such sulphur particles have an average particle size of 10 mm whereas in the presence of a leaching aid they have an average particle size of 1 to 2 mm. It is of course to be understood that the present invention is in no way intended to be limited to such a mechanism.

As indicated above, the leaching aid may comprise one or more compounds of the general formula (I)

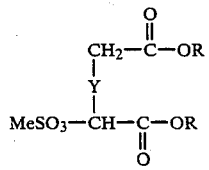
(I)

wherein

Me is an alkali metal,

Y is a single carbon to carbon bond or an alkylene chain of not more than 4 carbon atoms and the R's, the same or different, each represents an alkyl group of 3 to 8 carbon atoms.

The alkali metal (Me) may, for example, be Na or K; preferably, Me is Na.

Y is preferably, a single bond i.e. a single carbon to carbon bond.

Each of the R's, preferably, represents an alkyl group of 5 to 8 carbon atoms.

The R's may be the same and may be straight or branched alkyl groups; for example, each R may be

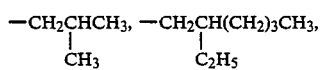

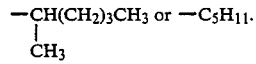

The R's may also be different; i.e. one R may be an alkyl group as referred to above and the other R may be a different alkyl group.

The compounds of general formula (I) may, in particular, be selected from among the diesters of sulphosuccinate salts. Compounds of general formula (I) thus, include dioctyl sodium sulfosuccinate, dihexyl sodium sulfosuccinate, dibutyl sodium sulfosuccinate, diisobutyl sodium sulfosuccinate, diamyl sodium sulfosuccinate, di(1-methyl-amyl) sodium sulfosuccinate, di(2-methyl-amyl) sodium sulfosuccinate and di(2-ethyl-hexyl) sodium sulfosuccinate.

The preferred leaching aid is di(2-ethyl-hexyl) sodium sulphosuccinate.

Compounds of general formula (I) are available commercially in various formulations from Cyanamid Canada Inc., under divers Aerosol trade mark designations as follows:

"Aerosol OT"—di(2-ethyl-hexyl) sodium sulfosuccinate;

"Aerosol AY"—diamyl sodium sulfosuccinate; and

"Aerosol MA"—di(1-methyl-amyl) sodium sulfosuccinate;

The formulations available from Cyanamid Canada Inc. include:

"Aerosol OT 100" which consists of di(2-ethyl-hexyl) sodium sulfosuccinate alone;

"Aerosol OT 70 PG" which consists of 70% by weight of di(2-ethyl-hexyl) sodium sulfosuccinate, the remainder being a mixture of water and propylene glycol; and "Aerosol AY 100" which consists of diamyl sodium sulfosuccinate alone.

Compounds of formula (I) may be prepared by adopting methods such as those disclosed, for example, in U.S. Pat. Nos. 2,028,091 and 2,176,423; British Pat. No. 446,568; and French Pat. No. 776,495.

The amount of leaching aid to be used will depend on the composition and nature of the complex metal-sulphide bearing material to be leached. The amount can, for example, range from about 100 to about 1000 ppm, in particular, from about 150 to about 1000 ppm relative to the material to be leached. The amount may, of course be higher or lower depending on the circumstances. In any event, the leaching aid is to be used in an amount which will enhance the extraction of metal values from a complex, metal-sulphide bearing material which is leached with a ferric chloride lixiviant, i.e. it is to be used in any effective leaching amount.

Aerosol OT 70 PG, may, for example, be used in an amount sufficient to provide from 125 to 1000 ppm, preferably, from 150 to 500 ppm of di(2-ethyl-hexyl) sodium sulfosuccinate relative to the material to be leached; such a leaching amount may be used with respect to New Brunswick bulk concentrate referred to herein.

The leaching aid can be added to the leaching medium in any suitable form. It may, for example, be added in the form of an aqueous mixture. The aqueous mixture can, if desired, also include a suitable solubilizing agent such as an alcohol. The solubilizing agent may be a simple alcohol such as methanol or isopropyl alcohol; it may be a glycol such as propylene glycol or ethylene glycol; or it may be glycerol. Any selected solubilizing agent should not inhibit the activity of the leaching aid.

The leaching aid can be added to the leaching medium in any suitable manner. For a batch process, the leaching aid may, for example, be pre-mixed with the required amount of leach solution prior to contact with the complex material. Alternatively, the leaching aid may be added to the leach mixture after the complex material has been brought into contact with the leach solution. For a two stage batch leach, best metal recoveries have been obtained by using a leaching aid during both leaching stages.

The complex feed material itself, may be selected from among complex, metal-sulphide bearing ores, their concentrates or the like. The feed material may, for example, be a pyritic bulk concentrate such as a pyritic Zn-Pb-Cu-Ag bulk concentrate obtained by bulk froth flotation of complex zinc sulphide, ore as found in Northeastern New Brunswick, Canada. The feed material may also contain other non-ferrous metal values in addition to Zn, Pb, Cu and Ag.

In general, a bulk concentrate may be treated with the $FeCl_3$ lixiviant without having been subjected to a prior grinding step. However, an ore or concentrate thereof may, if necessary or desired, be ground to 0.1 mm diameter or smaller.

The amount of ferric chloride present in the leaching medium will also depend on the nature and initial amount of the solid feed material, it is desired to leach. The initial aqueous leach solution may, for example, contain from about 0.5 to about 2.5 Moles/liter of ferric chloride, e.g. 2.0 Moles/liter of ferric chloride (hereinafter Moles/liter=M).

The amount of ferric chloride, present in the leaching medium, can also depend on the leaching method it is desired to use (e.g. on whether a one or plural stage leach is to be used).

For a single stage leach, it is preferable for ferric chloride to be present, in the initial leach solution, in excess of the stoichiometric amount needed to carry out the leach of metal values e.g. 162 g of New Brunswick bulk concentrate, as referred to herein, may be contacted with one liter of a lixiviant of 2.0M $FeCl_3$. The final leach liquor obtained from a single stage leach may, however, contain a significant residual concentration of ferric ion, i.e. ferric ions which have not been utilized to extract metal values.

A two stage leach may provide a more efficient alternative, to a single stage leach, with respect to ferric ion utilization.

As described above, in accordance with a two stage leach, conditions may be selected so that the oxidizing component (e.g. $Fe^{3+}$) is present, for the second leach stage, in excess of the stoichiometric amount needed to leach metal values from the leach residue obtained from the first leach stage; conversely, conditions may be selected so that the oxidizing component (e.g. $Fe^{3+}$), is present, for the first leach stage, in a stoichiometric amount which is less than that needed to carry out the leach of metal values from the starting complex material. Thus, for such a two stage leach, a ferric chloride leach medium (e.g. recycled lixiviant) may be fed to the second leach stage, where it is used to re-leach the leach residue from the first leach stage, i.e. to re-leach the solid residue (of the complex feed material) obtained from the first leach stage; on the other hand, ferric chloride leach liquor from the second leach stage may be fed to the first leach stage (if desired, after having first been subjected to a $Fe^{3+}$ regeneration treatment) to attack fresh, complex, metal-sulphide bearing material. In this way, a final leach liquor may be obtained from the first leach stage wherein substantially all of the iron present in solution is in ferrous form. The final leach liquour from the first leach stage may thereafter be processed in known manner to recover metal values and to regenerate aqueous ferric chloride leach solution that may be recycled to the second leach stage.

Sufficient chloride ions should also be available during a leach, (whether single or plural stage), to assist in keeping the desired metal values in solution, as soluble metal chlorides thereof. Excess chloride ions may, if desired, be provided by alkali metal chlorides such as NaCl or KCl or by alkaline earth metal chlorides such as $CaCl_2$. The use of NaCl or other suitable chloride to increase the solubility of Pb, Cu, Ag ... etc. will favour the use of a concentrated $FeCl_3$ leach media (e.g. a conc. > 2.0M $FeCl_3$); the high $FeCl_3$ concentration in turn will facilitate the dissolution of the metal values. The addition of an alkaline earth metal chloride such as $CaCl_2$ can also have the beneficial effect of precipitating out any $CaSO_4$ and thus control sulphate build-up in the leach liquor.

These other chlorides may be used in any suitable amount. The alkali metal chloride (MeCl), for example, may be used at a concentration of from about 2.0 to about 3.5 Moles MeCl/liter of leach solution. An alkaline earth metal such as $CaCl_2$ may be used in the amount of from 0 to about 180 g $CaCl_2$/Kg of material to leached (e.g. 50 g $CaCl_2$/Kg of material to leached).

The dissolution rate of various metal values is, as indicated above, dependent on temperature, the dissolution rate thereof increasing with increasing temperature. At atmospheric pressure, the leach process of the present invention may be conducted at temperatures which can range up to around the boiling point of the reaction mixture. The presence of chlorides such as alkali metal chlorides may serve to increase the temperature at which the leach solution may be maintained. A higher leach temperature will promote the leach kinetics of Cu and Ag and increase the solubilities of metal values such as Pb, Cu and Ag.

A relatively high leach temperature, coupled with a stoichiometric excess of complex material relative to the ferric ion concentration in the leach solution, can also be exploited to effectively reduce all or substantially all of the ferric ion to the ferrous state; see stage one of the two stage leach referred to above. The so obtained leach liquor may then be sent on to subsequent treatment operations which require solutions having a low ferric ion concentration. It should be kept in mind that leaching at too elevated a temperature may give rise to problems relating to corrosion and/or energy expenses.

The leach process in accordance with the present invention, depending on the reaction mixture, may be carried out (at atmospheric pressure) at a reaction or dissolution temperature in the range of from about 100° C. to about 110° C., for example, at a temperature of about 107° C. to 108° C.

Low temperatures, such as those below 85° C., should be avoided in order to inhibit the precipitation of salts such as $PbCl_2$ and $AgCl$.

The leach may be carried out at superatmospheric pressure, however, atmospheric pressure is preferred.

It has been found that metal extractions are independent of the concentration of free acid, such as free HCl. It is believed that the principle role of a free acid, such as HCl, is to inhibit iron hydrolysis and precipitation; if necessary or desired, enough free acid can be added to the lixiviant for this purpose.

Complex metal-sulphide bearing materials also commonly contain minor amounts of iron, magnesium, and/or calcium carbonates. Accordingly, if necessary or desired, an acid, such as HCl, can also be added so as to additionally neutralize such carbonates.

An acid, such as HCl, may be used in the amount of from 0 to about 16 g HCl/liter of leach solution, e.g. from about 2.5 to about 4 g HCl/liter of leach solution.

The retention time is subject to a number of variables such as the nature and composition of the material to be leached, the leach temperature, the composition of the leach solution . . . etc. In general, a retention time (cumulative) of from about 7.5 h to about 8.0 h may be used for a two stage leach such as described above. A retention time of about 5 h may be used for a single stage leach. The retention time may, however, be longer or shorter depending on the circumstances.

A pyritic Zn-Pb-Cu-Ag bulk concentrate may, for example, be subjected to a two stage leach at atmospheric pressure, at a temperature of about 107° C., applying an aqueous leaching medium containing $FeCl_3$, HCl and NaCl to the second stage and using a total retention time of about 7.5 h, e.g. about 3.0 h for the first stage and about 4.5 h for the second stage.

Whether using a single or two stage leach sufficient agitation should be provided to keep the solids in suspension.

The leach process, in accordance with the present invention, may be carried out in a batch or a continuous manner.

As previously mentioned, in the absence of a leaching aid as described above, the following extractions (% by wt) have been found with respect to an aqueous leach of a complex pyritic Zn-Pb-Cu-Ag bulk concentrate using the specified leaching conditions:

For a single stage batch leach obtaining extractions of 99.5% Pb, 95% Zn, 85% Cu and 85% Ag:

| | |
|---|---|
| Solids/Liquid ratio = | 162 g concentrate/liter lixiviant |
| Temperature = | 103° C. |
| Pressure = | atmospheric |
| Particle size = | 76% < 36 μm |
| Lixiviant = | 2.0 M $FeCl_3$, 0.2 M HCl |
| Retention time = | 5.0 h |

For a two stage batch leach obtaining extractions of 99.0% Pb, 97.5% Zn, 95.0% Cu and 91.5% Ag:

| Stage I | |
|---|---|
| Solids/Liquid ratio = | 162 g concentrate/liter lixiviant |
| Temperature = | 107° C. to 108° C. |
| Pressure = | atmospheric |
| Particle size = | 76% < 36 μm |
| Lixiviant = | 0.9 M $FeCl_3$, 0.43 M HCl, 3.5 M NaCl |
| Retention time = | 3.0 h |

| Stage II | |
|---|---|
| Solids/Liquid ratio = | 100 g Stage I residue/liter lixiviant |
| Temperature = | 107° C. to 108° C. |
| Pressure = | atmospheric |
| Lixiviant = | 0.90 M $FeCl_3$, 0.43 M HCl, 3.5 M NaCl |
| Retention time = | 4.5 h |

On the other hand, in the presence of a leaching aid, enhanced extractions (% by wt) of the metal values have been discovered. For example, for a two stage, batch, aqueous leach, carried out in the presence of a leaching aid (e.g. di(2-ethylhexyl) sodium sulphosuccinate), extractions of 99.5% Pb, 99.5% Zn, 98.0% Cu and 96.5% Ag were obtained using conditions such as those described below in EXAMPLE III.

EXAMPLES

In the following examples which illustrate embodiments of the present invention, the starting complex metal-sulphide bearing material to be leached, was a bulk concentrate obtained from an ore body in New Brunswick. The bulk concentrate had the characteristics as described below in Tables I, II, III and IV. The term "ppm", unless indicated otherwise, is to be understood as being taken relative to the solids to be leached; and M=moles/liter.

TABLE I

| Mineral content of Bulk Concentrate | | |
|---|---|---|
| Mineral | Formula | wt % |
| sphalerite | ZnS | 49.38 |
| pyrite | $FeS_2$ | 32.88 |
| galena | PbS | 9.37 |
| anglesite | $PbSO_4$ | 1.98 |
| chalcopyrite | $CuFeS_2$ | 1.86 |
| siderite | $FeCO_3$ | 1.80 |
| quartz | $SiO_2$ | 0.90 |
| calcite | $CaCO_3$ | 0.54 |
| arsenopyrite | FeAsS | 0.46 |
| dolomite | $MgCO_3$, $CaCO_3$ | 0.38 |
| tetrahedrite | $(Cu, Ag)_{12} Sb_4 S_{14}$ | 0.25 |
| pyrrhotite | $Fe_{1-x}S$ | 0.01 |

TABLE II

| Proportion of minerals as Free and locked Grains | | | | |
|---|---|---|---|---|
| | wt % as Free | wt % as Locked Grains | | |
| Mineral | Grains | in pyrite | in sphalerite | total |
| sphalerite | 80.6 | 19.4 | n.a. | 19.4 |
| galena | 66.6 | 5.4 | 28.0 | 33.4 |
| chalcopyrite | 84.1 | 0.4 | 15.5 | 15.9 |

TABLE III

| Chemical Analysis of the Bulk Concentrate, wt % | | | | | | | | | |
|---|---|---|---|---|---|---|---|---|---|
| Zn | Pb | Cu | Ag[1] | Fe | $S_T$ | Oxides[2] | $SO_4/S$ | As | Sb |
| 28.3 | 8.67 | 0.62 | 261 | 17.8 | 33.3 | 0.48 | 2.59 | 0.29 | 0.09 |

[1]ppm;
[2]as $K_2O$, CaO, MgO; T = total

TABLE IV

| Screen Analysis of the Bulk Concentrate | |
|---|---|
| Size Fraction[1] | |
| μm | wt % |
| +74 | 2.35 |
| +53 | 3.09 |
| +44 | 7.67 |
| +37 | 10.52 |
| <37 | 76.37 |

[1] Wet screen technique

Unless otherwise specified in the examples below, the tests were conducted using a suitable batch vessel equipped with agitation means sufficient to maintain a slurry and:

For a single stage, batch, aqueous ferric chloride leach, the following standard leaching conditions were used:

| | |
|---|---|
| Solid/Liquid ratio = | 162 g concentrate/liter lixiviant |
| Temperature = | 107° C. to 108° C. |
| Pressure = | atmospheric |
| Lixiviant = | 1.88 M FeCl$_3$, 2.4 M NaCl, 0.12 M HCl |
| Retention time = | 5 hours |

For a two stage, batch, aqueous ferric chloride leach, the following standard leaching conditions were used:

| Stage I | |
|---|---|
| Bulk concentrate = | 202.5 g |
| Solids/Liquid ratio = | 162 g concentrate/liter lixiviant |
| Temperature = | 107° C. to 108° C. |
| Pressure = | atmospheric |
| Lixiviant = | 0.9 M FeCl$_3$, 3.0 M NaCl, 0.43 M HCl, 10 g/l CaCl$_2$.2H$_2$O, 16.1 g/l PbCl$_2$ |
| Retention time = | 3 hours |
| N$_2$ sparge | |

| Stage II | |
|---|---|
| Material to be leached = | air dried residue from stage I |
| Amount of Lixiviant = | 1.25 liter |
| Temperature = | 107° C. to 108° C. |
| Lixiviant = | 0.9 M FeCl$_3$, 3.0 M NaCl, 0.43 M HCl, 4 g/l ZnCl$_2$ |
| Retention time = | 4.5 hours |

EXAMPLE I

Single Stage Batch Leach

Two, single stage batch leach tests were carried out. For these tests the standard conditions as described above were used. For both tests no CaCl$_2$ was used in the lixiviant. One test was conducted without any leaching aid. A second test was made using Aerosol OT 70 PG as the source of the leaching aid. Sufficient Aerosol OT 70 PG was used to provide a leaching medium with 350 ppm of di(2-ethyl-hexyl) sodium sulphosuccinate. The results of the leaches are given in TABLE V below:

TABLE V

| | Metal Extraction for Single Stage Leach | | | | |
|---|---|---|---|---|---|
| Test | Metal Extraction (% by wt) | | | | |
| no. | Pb | Zn | Cu | Ag | Comments |
| 1 | 99.5 | 96.4 | 94.2 | 94.2 | no leaching aid |

TABLE V-continued

| | Metal Extraction for Single Stage Leach | | | | |
|---|---|---|---|---|---|
| Test | Metal Extraction (% by wt) | | | | |
| no. | Pb | Zn | Cu | Ag | Comments |
| 2 | 99.6 | 99.5 | 98.7 | 96.7 | with leaching aid |

EXAMPLE II

Two Stage Batch Leach

Two, two stage batch leach tests were carried out. For these tests the standard conditions as described above were used except that CaCl$_2$ was not used. One test was conducted without any leaching aid. A second test was made using Aerosol OT 70 PG as the source of the leaching aid. For each leach stage of the second test, sufficient Aerosol OT 70 PG was used so as to provide a leaching medium with 350 ppm of di(2-ethyl-hexyl) sodium sulphosuccinate. The results of the leach are given in TABLE VI below:

TABLE VI

| | Metal Extraction for Two Stage Leach | | | | |
|---|---|---|---|---|---|
| Test | Metal Extraction (% by wt) | | | | |
| no. | Pb | Zn | Cu | Ag | Comments |
| 1 | 99.5 | 98.3 | 93.9 | 91.6 | no leaching aid |
| 2 | 99.6 | 98.7 | 95.5 | 94.3 | with leaching aid |

As can be seen from TABLE V and TABLE VI above, the presence of the leaching aid enhanced metal value extraction; it was also seen to suppress foaming.

EXAMPLE III

Large Scale Two Stage Batch Leach

Large scale, two stage batch leach tests were conducted using the standard conditions referred to above, except that 8.424 kg of New Brunswick bulk concentrate was used with a corresponding amount of lixiviant in both stages, i.e. namely 52 liters of lixiviant in each stage. In tests nos. 1 to 3 neither CaCl$_2$ nor any leaching aid was used. CaCl$_2$ was added (in the first stage only) for test nos. 4 and 5, in an amount of 138 g/Kg of bulk concentrate; no leaching aid was used. For test nos. 6 to 10, CaCl$_2$ and a leaching aid were both used; CaCl$_2$ was used in the manner and amounts indicated for test nos. 4 and 5; Aerosol OT 70 PG was used as the source of the leaching aid. For each leach stage of test nos. 6 to 10, sufficient Aerosol OT 70 PG was used to provide a leaching medium with 175 ppm of di(2-ethyl-hexyl) sodium sulphosuccinate. The results of the leaches are given in TABLE VII below:

TABLE VII

| | Metal Extraction for large scale two stage leach | | | | |
|---|---|---|---|---|---|
| Test | Metal Extraction (% by wt)[1] | | | | |
| nos. | Pb | Zn | Cu | Ag | Comments |
| (1–3) | 99.4 | 96.7 | 92.1 | 91.0 | no CaCl$_2$, no leaching aid |
| (4 & 5) | 99.4 | 97.9 | 94.5 | 92.5 | with CaCl$_2$, no leaching aid |
| (6–10)* | 99.5 | 99.5 | 98.0 | 96.5 | with CaCl$_2$, with leaching aid |

[1] Metal extractions are averages
*test 10 used 4 hours for stage II

As can be seen from TABLE VII the presence of the leaching aid not only enhances the extraction of the secondary metal values (i.e. Cu and Ag) but also that of the primary metal value Zn. No foaming problems were experienced during the test with the leaching aid.

EXAMPLE IV

Two Stage Batch Leach Using Different Leaching Aids

Further tests were conducted using di(2-ethyl-hexyl) sodium sulfosuccinate and diamyl sodium sulfosuccinate as leaching aids. The standard two stage leach conditions referred to above were used.

Aerosol OT 70 PG and Aerosol OT 100 were used as sources for di(2-ethyl-hexyl) sodium sulfosuccinate and Aerosol AY 100 was used as the source for diamyl sodium sulfosuccinate. Sufficient Aerosol OT 70 PG, Aerosol OT 100 and Aerosol AY 100, were used to provide a leaching medium with a respective amount of leaching aid as indicated in TABLE VIII below. In some of the tests no leaching aid was used for either stage while in other tests the leaching aid was used for both the first and second leach stages. The test results are shown in TABLE VIII below; the metal extraction indicated for the second stage, is the cumulative (or total) extraction after both leach stages:

TABLE VIII

Metal extraction using two different leaching aids

| ppm of Leaching Aid | Leach Stage | Metal Extraction (% by wt) | | | | "Aerosol" Source used |
|---|---|---|---|---|---|---|
| | | Pb | Zn | Cu | Ag | |
| none | 1 | 99.4 | 59.8 | 47.8 | 54.0 | — |
| none | 2 | 99.6 | 97.4 | 90.7 | 94.1 | — |
| none | 1 | 99.3 | 62.2 | 49.4 | 63.9 | — |
| none | 2 | 99.6 | 98.4 | 93.0 | 95.4 | — |
| 175 | 1 | 99.5 | 60.2 | 50.9 | 75.9 | OT-70-PG |
| 175 | 2 | 99.7 | 99.7 | 98.0 | 96.3 | OT-70-PG |
| 250 | 1 | 99.5 | 65.7 | 54.0 | 68.6 | AY-100 |
| 250 | 2 | 99.7 | 99.6 | 96.7 | 95.4 | AY-100 |
| 250 | 1 | 99.5 | 63.1 | 54.4 | 80.5 | OT-100 |
| 250 | 2 | 99.7 | 99.7 | 98.7 | 96.6 | OT-100 |

Although a leaching aid may be present for only one stage of a two stage batch leach, best recoveries have been obtained when a leaching aid is present during both leach stages.

The presence of the leaching aid during the ferric chloride leach of complex metal-sulphide bearing materials, not only enhances the recovery of secondary metal values (Cu/Ag) but also that of zinc, a primary metal value. For the tests no foaming problems were encountered with the presence of the leaching aid.

The embodiments of the invention in which an exclusive property or privilege is claimed are as defined as follows:

1. A process for leaching a complex, metal-sulphide bearing material, wherein said material is contacted with an aqueous ferric chloride leach solution whereby metal values are brought into solution as chlorides thereof, characterized in that said material is contacted with said leach solution in the presence of an effective amount of a leaching aid comprising one or more compounds of general formula (I)

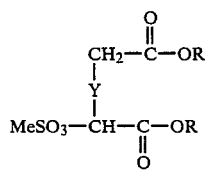

wherein
Me is an alkali metal,
Y is a single carbon to carbon bond or an alkylene chain of not more than 4 carbon atoms and
the R's, the same or different, each represents an alkyl group of 3 to 8 carbon atoms,
said effective amount being at least about 100 ppm relative to said material.

2. A process as defined in claim 1 wherein, in the general formula (I), Y is a single carbon to carbon bond and the R's are the same and each represents an alkyl group of 5 to 8 carbon atoms.

3. A process as defined in claim 2 wherein, in the general formula (I), Me is sodium.

4. A process as defined in claim 2 wherein said material is a bulk concentrate of a complex, metal-sulphide bearing ore.

5. A process as defined in claim 3 wherein said material is a bulk concentrate of a complex, metal-sulphide bearing zinc ore, wherein said material contains metal sulphides of primary metal values and secondary metal values, wherein said primary metal values comprise lead and zinc and wherein said secondary metal values comprise copper and silver.

6. A process as defined in claim 1 wherein said leach is carried out in the presence of one or more leaching aids selected from the group of compounds consisting of dioctyl sodium sulfosuccinate, dihexyl sodium sulfosuccinate, diamyl sodium sulfosuccinate, di(1-methyl-amyl) sodium sulfosuccinate, di(2-methyl-amyl) sodium sulfosuccinate and di(2-ethyl-hexyl) sodium sulfosuccinate.

7. A process as defined in claim 1 wherein said leaching aid is di(2-ethyl-hexyl) sodium sulfosuccinate.

8. A process as defined in claim 4 wherein said leach is carried out in the presence of one or more leaching aids selected from the group of compounds consisting of dioctyl sodium sulfosuccinate, dihexyl sodium sulfosuccinate, diamyl sodium sulfosuccinate, di(1-methyl-amyl) sodium sulfosuccinate, di(2-methyl-amyl) sodium sulfosuccinate and di(2-ethyl-hexyl) sodium sulfosuccinate.

9. A process as defined in claim 4 wherein said leaching aid is di(2-ethyl-hexyl) sodium sulfosuccinate.

10. A process as defined in claim 5 wherein said leach is carried out in the presence of one or more leaching aids selected from the group of compounds consisting of dioctyl sodium sulfosuccinate, dihexyl sodium sulfosuccinate, diamyl sodium sulfosuccinate, di(1-methyl-amyl) sodium sulfosuccinate, di(2-methyl-amyl) sodium sulfosuccinate and di(2-ethyl-hexyl) sodium sulfosuccinate.

11. A process as defined in claim 5 wherein said leaching aid is di(2-ethyl-hexyl) sodium sulfosuccinate.

12. A process as defined in claim 10 wherein the amount of said leaching aid is in the range of from 150 to 1000 ppm relative to the material to be leached.

13. A process as defined in claim 5 wherein said leaching aid is di(2-ethyl-hexyl) sodium sulfosuccinate and the amount of said leaching aid is in the range of from 150 to 500 ppm relative to the material to be leached.

14. A two stage leach process for leaching a complex, metal-sulphide bearing material, wherein fresh, complex, metal-sulphide bearing material is fed to a first leach stage, wherein the residue of said material from the first leach stage is fed to a second leach stage, wherein, for each of said leach stages, the material to be leached is contacted with a respective aqueous ferric chloride leach solution whereby metal values are brought into solution as chlorides thereof, said leach solutions each comprising a respective oxidizing component, wherein for the first leach stage said fresh complex material is present in stoichiometric excess relative to the oxidizing component of the first stage leach solution, wherein for the second leach stage the oxidizing component of the second stage leach solution is present in stoichiometric excess relative to said residue, characterized in that for each leach stage, the material to be leached is contacted with a respective leach solution in the presence of an effective amount of a leaching aid comprising one or more compounds of general formula (I)

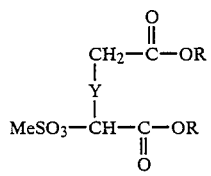

wherein
  Me is an alkali metal,
  Y is a single carbon to carbon bond or an alkylene chain of not more than 4 carbon atoms and
  the R's, the same or different, each represents an alkyl group of 3 to 8 carbon atoms,
said effective amount being at least about 100 ppm relative to the material to be leached.

15. A process as defined in claim 14 wherein, in the general formula (I), Y is a single carbon to carbon bond and the R's are the same and each represents an alkyl group of 5 to 8 carbon atoms.

16. A process as defined in claim 15 wherein, in the general formula (I), Me is sodium, and wherein said material is a bulk concentrate of a complex, metal-sulphide bearing ore.

17. A process as defined in claim 16 wherein said material is a bulk concentrate of a complex, metal-sulphide bearing zinc ore, wherein said material contains metal sulphides of primary metal values and secondary metal values, wherein said primary metal values comprise lead and zinc and wherein said secondary metal values comprise copper and silver.

18. A process as defined in claim 14 wherein said leach is carried out in the presence of one or more leaching aids selected from the group consisting of compounds consisting of dioctyl sodium sulfosuccinate, dihexyl sodium sulfosuccinate, diamyl sodium sulfosuccinate, di(1-methyl-amyl) sodium sulfosuccinate, di(2-methyl-amyl) sodium sulfosuccinate and di(2-ethyl-hexyl) sodium sulfosuccinate.

19. A process as defined in claim 16 wherein said leach is carried out in the presence of one or more leaching aids selected from the group of compounds consisting of dioctyl sodium sulfosuccinate, dihexyl sodium sulfosuccinate, diamyl sodium sulfosuccinate, di(1-methyl-amyl) sodium sulfosuccinate, di(2-methyl-amyl) sodium sulfosuccinate and di(2-ethyl-hexyl) sodium sulfosuccinate.

20. A process as defined in claim 17 wherein said leaching aid is di(2-ethyl-hexyl) sodium sulfosuccinate and the amount of said leaching aid is in the range of from 150 to 500 ppm relative to the material to be leached.

* * * * *